(12) United States Patent
Walega et al.

(10) Patent No.: US 12,351,031 B2
(45) Date of Patent: Jul. 8, 2025

(54) COMPACT P2 HYBRID ARCHITECTURE

(71) Applicant: EXEDY GLOBALPARTS CORPORATION, Belleville, MI (US)

(72) Inventors: Kenneth Gerard Walega, Northville, MI (US); Bryant David Grytzelius, Canton, MI (US)

(73) Assignee: Exedy GlobalParts Corporation, Belleville, MI (US)

( * ) Notice: Subject to any disclaimer, the term of this patent is extended or adjusted under 35 U.S.C. 154(b) by 0 days.

(21) Appl. No.: 18/288,781

(22) PCT Filed: May 11, 2022

(86) PCT No.: PCT/US2022/028826
§ 371 (c)(1),
(2) Date: Oct. 27, 2023

(87) PCT Pub. No.: WO2022/241026
PCT Pub. Date: Nov. 17, 2022

(65) Prior Publication Data
US 2024/0217331 A1 Jul. 4, 2024

Related U.S. Application Data

(60) Provisional application No. 63/187,252, filed on May 11, 2021.

(51) Int. Cl.
*B60K 6/40* (2007.10)
*B60K 6/387* (2007.10)
(Continued)

(52) U.S. Cl.
CPC ............... *B60K 6/40* (2013.01); *B60K 6/387* (2013.01); *B60K 6/48* (2013.01); *F16H 45/02* (2013.01);
(Continued)

(58) Field of Classification Search
CPC . B60K 6/40; B60K 6/387; B60K 6/48; B60K 2006/4825; F16H 45/02; F16H 2045/002
See application file for complete search history.

(56) References Cited

U.S. PATENT DOCUMENTS 2,957,562 A    10/1960   Rudisch
5,273,409 A * 12/1993   Swain ..................... F16D 29/00
                                                                              192/84.91

(Continued)

FOREIGN PATENT DOCUMENTS

WO    2020/243040 A1   12/2020
WO    2021/081508 A1   4/2021

*Primary Examiner* — Huan Le
(74) *Attorney, Agent, or Firm* — Honigman LLP; Eric J. Sosenko; Jonathan P. O'Brien

(57) ABSTRACT

A compact P2 hybrid module for connecting an internal combustion engine to a transmission of a vehicle. The P2 module includes an input shaft, an electric motor having a stator and a rotor, a torque converter having a front cover and a rear cover. The torque converter further including an impeller and a turbine coupled to one another so as to form a hydrodynamic circuit, and the turbine being further coupled to an output member of the torque converter. The front cover of the torque converter being rotationally fixed with the rotor of the electric motor. An electric connect/disconnect friction clutch assembly having first and second sets of friction plates. The first and second sets of friction plates being rotationally lockable with one another during engagement of the electric connect/disconnect friction clutch assembly. An electro-mechanical controllable clutch assembly having an input member and an output member.

2 Claims, 2 Drawing Sheets

(51) Int. Cl.
  *B60K 6/48* (2007.10)
  *F16H 45/00* (2006.01)
  *F16H 45/02* (2006.01)
(52) U.S. Cl.
  CPC ... *B60K 2006/4825* (2013.01); *B60Y 2200/92* (2013.01); *F16H 2045/002* (2013.01)

(56) References Cited

U.S. PATENT DOCUMENTS

| | | |
|---|---|---|
| 7,810,592 B2 | 10/2010 | Klemen et al. |
| 9,243,669 B2 | 1/2016 | Frait et al. |
| 2022/0379712 A1* | 12/2022 | Walega .................. B60K 6/387 |

* cited by examiner

COMPACT P2 HYBRID ARCHITECTURE

CROSS REFERENCE TO RELATED APPLICATION

This application claims priority to U.S. provisional application No. 63/187,252 filed May 11, 2021, the entire contents of which are herein incorporated by reference.

BACKGROUND

1. Field of the Invention

The present invention generally relates to powertrains for motor vehicles and, more particularly, to a P2 module for a hybrid powertrain, such as would be utilized in an automotive vehicle.

2. Description of Related Art

Today, the automotive industry is increasingly moving away from combustion engine vehicles and toward electric vehicles. While the technology is improving, one drawback of an all-electric vehicle (EV) is the current limitation on battery technology and, resultantly, the mileage range of such vehicles. While drivers who only have short range needs do not consider this a inconvenience, drivers who at least occasionally have mileage needs beyond the range of a typical all-electric vehicle must generally choose between stopping for extended periods of time to recharge the battery or owning a second vehicle that does have an extended driving range.

There is, however, a bridge between these two choices. That bridge includes hybrid vehicles (HV) and plug-in hybrid vehicles (PHEV). Hybrid vehicles alternate between use of a combustion engine and an electric motor to power the vehicle. The net effect being a higher effective gas mileage than a combustion engine vehicle, but lower than an EV. Plug-in hybrid vehicles run on electricity as their primary power source, but will utilize a combustion engine as a backup power source to extend the range of the vehicle.

While vehicles with strictly gas or diesel powertrains are currently the preference of consumers, next, and increasingly, consumers prefer vehicles with hybrid powertrains.

Various drivetrain architectures exist for hybrid vehicles. These hybrid architectures are generally known as P1, P2, P3 and P4 configurations. In a P1 configuration, the electric motor is connected to the combustion engine and located after the combustion engine. A P2 configuration locates the electric motor between the combustion engine and the transmission, but the electric motor is not connected to the combustion engine. As such, a P2 configuration allows the combustion engine to be disconnected from the transmission when not in use. A P3 configuration locates the electric motor between the transmission and the differential. In a P4 configuration, the electric motor directly drives the axles.

Of these configurations, the P2 configuration is considered very versatile since it allows hybrid technology to be incorporated in to existing combustion engine powertrains with minimal modification to the existing powertrain. As the automotive industry moves toward hybrid vehicles, a compact P2 module is needed to facilitate packaging of the module in existing vehicle architectures, particularly in vehicles having a front wheel drive configuration.

A P2 module having a conventional configuration is illustrated in FIG. 1. As seen therein, a damper (not shown) fills the empty space to the left of the electric motor and a hydraulic disconnect clutch is mounted radially inside of the electric motor. The rotor of the electric motor is constrained axially by a portion of the clutch cylinder, which is in turn secured to the torque converter. This mechanism of axially constraining the rotor increases the axial packaging of the P2 module.

SUMMARY OF THE INVENTION

In view of the above, the present invention provides a device for power transmission between the output of an engine and the input of a transmission.

The device is a compact P2 module which provides an architecture that decreases the required axial packaging over know designs and, therefore, renders the P2 module efficient for integration in vehicles having front wheel drive configurations, as well as integration into vehicles have rear wheel drive configurations.

In one aspect the invention provides a compact P2 module including a torque converter, an electric motor, an electro-mechanical controllable clutch (a dynamic controllable clutch) and an electric connect/disconnect friction clutch.

In yet another aspect, the invention provides a compact P2 hybrid module for connecting an internal combustion engine to a transmission of a vehicle. The P2 module including an input shaft; an electric motor having a stator and a rotor; a torque converter having a front cover and a rear cover, the torque converter further including an impeller and a turbine coupled to one another so as to form a hydrodynamic circuit, the turbine being further coupled to an output member of the torque converter, the front cover of the torque converter being rotationally fixed with the rotor of the electric motor; an electric connect/disconnect friction clutch assembly, the electric connect/disconnect friction clutch assembly having first and second sets of friction plates, the first and second sets of friction plates being rotationally lockable with one another during engagement of the electric connect/disconnect friction clutch assembly; and an electro-mechanical controllable clutch assembly, the electro-mechanical controllable clutch assembly having an input member and an output member, the input member and output member being rotationally lockable with one another during engagement of the electro-mechanical controllable clutch assembly.

In another aspect, the electric connect/disconnect friction clutch assembly is located radially inward of the electric motor.

In a further aspect, the electro-mechanical controllable clutch assembly is generally located radially inward of the electric connect/disconnect friction clutch assembly.

In an additional aspect, the first set of friction plates of the electric connect/disconnect friction clutch assembly are rotationally fixed with the rotor In another aspect, the second set of friction plates are rotationally fixed with the input shaft.

In a further aspect, the electric connect/disconnect friction clutch assembly further includes an actuator, the actuator including member being axially moveable and configured to engage the first and second sets of friction plates with one another during engagement of the electric connect/disconnect friction clutch assembly.

In an additional aspect, the actuator includes an armature and a piston, the piston being the axially moveable member of the actuator.

In still another aspect, the input member of the electro-mechanical controllable clutch assembly is rotationally fixed with the input shaft.

In yet a further aspect, the output member of the electro-mechanical controllable clutch assembly is rotationally fixed with the rotor.

In an additional aspect, the input member of the electro-mechanical controllable clutch assembly is a clutch rotor.

In a further aspect, the output member of the electro-mechanical controllable clutch assembly is coupled to a clutch armature of the electro-mechanical controllable clutch assembly.

In another aspect, the output member of the electro-mechanical controllable clutch assembly defines a reaction plate of the electric connect/disconnect friction clutch assembly.

In still a further aspect, a torque path from the engine to the transmission, the electro-mechanical controllable clutch assembly being located upstream in the torque path relative to the electric connect/disconnect friction clutch assembly.

BRIEF DESCRIPTION OF THE DRAWINGS

FIG. 2 is a schematic cross-sectional view of a P2 module, including a torque converter, incorporating an architecture in accordance with the principles of the present invention.

DETAILED DESCRIPTION

Figure 1:
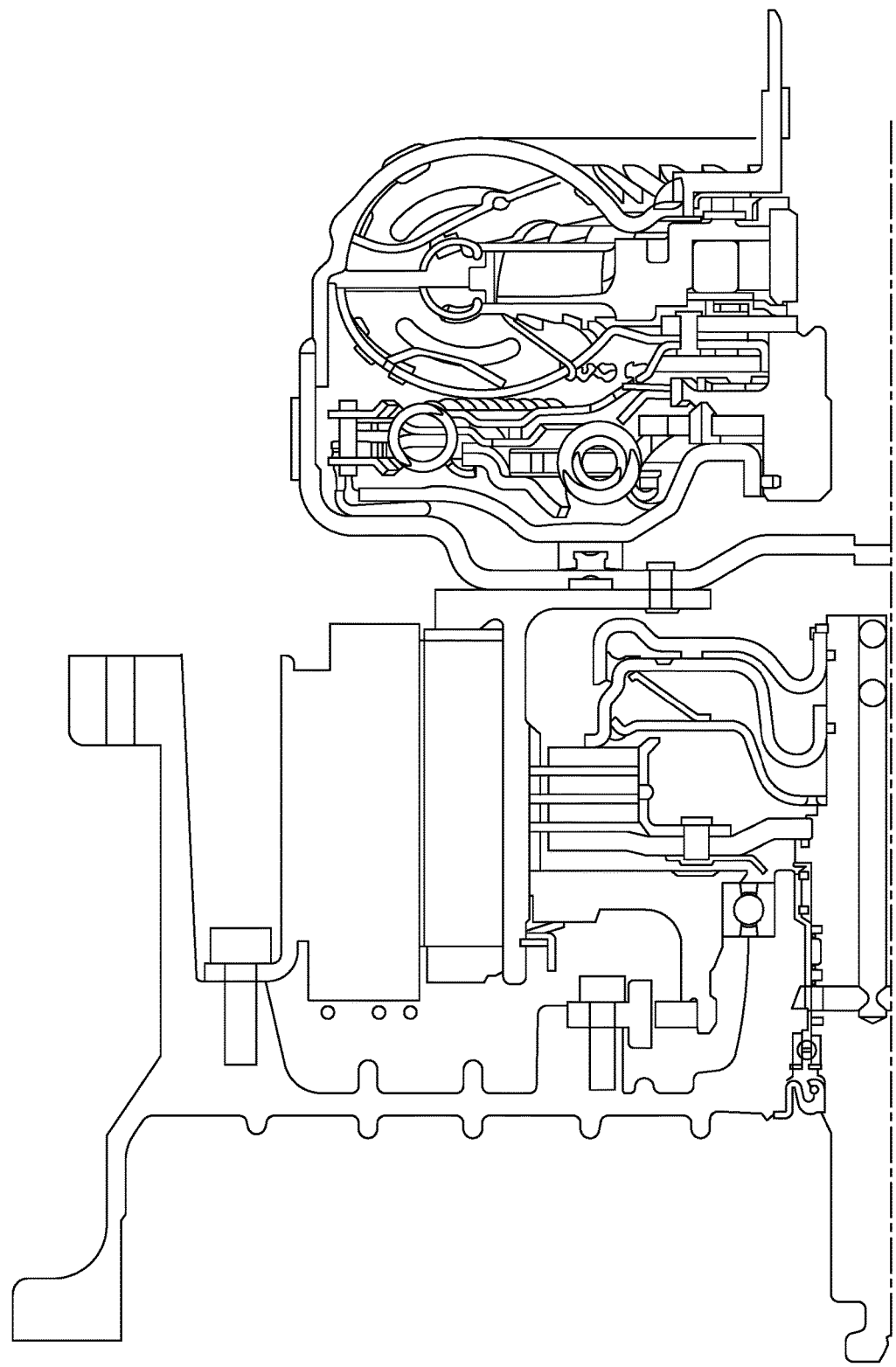
FIG. 1 is a schematic cross-sectional view of a P2 module, including a torque converter, having a conventional architecture.

As used in the description that follows, directional terms such as "upper" and "lower" are used with reference to the orientation of the elements as presented in the drawing. Accordingly, "upper" indicates a direction toward the top of the figure and "lower" indicates a direction toward the bottom of the figure. The terms "left" and "right" are similarly interpreted. When used, the terms "inward" or "inner" and "outward" or "outer" indicate a direction that is generally toward or away from a central axis of the referred to part whether or not such an access is designated in the figures. An axial surface is therefore one that faces in the axial direction. In other words, an axial surface faces in a direction along the central axis. A radial surface therefore faces radially, generally away from or toward the central axis. It will be understood, however, that in actual implementation, the directional references used herein may not necessarily correspond with the installation and orientation of the corresponding components or device.

Figure 2:
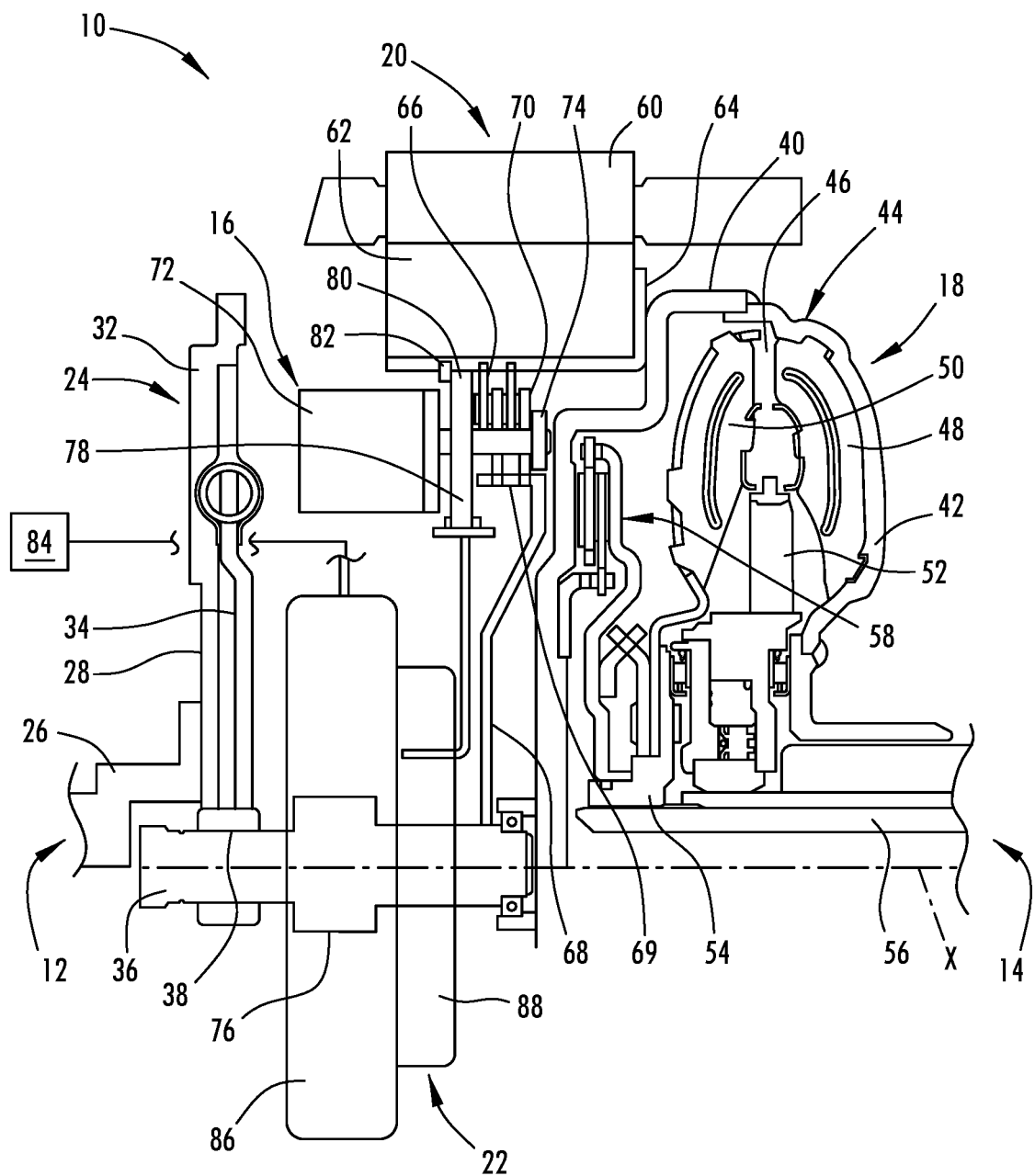
FIG. 2 illustrates a P2 module having an architecture incorporating the principles of the present invention.

Referring now to the drawing shown in FIG. 2, a device, a P2 module, embodying the principles of the present invention is generally illustrated therein and designated at 10. The P2 module 10 is positioned between an internal combustion engine 12 and a transmission 14 of a motor vehicle. As illustrated in FIG. 2, the complete engine 12 and transmission 14 are not illustrated. Rather, the respective output and input components of each are illustrated, relative to the central axis X of the P2 module 10, and further discussed below. The P2 module 10 includes as it principal components an electric connect/disconnect friction clutch 16 (in the form of a K0 clutch assembly), a torque converter 18, an electric motor 20 and an electro-mechanical controllable clutch 22. Optionally, a damper system 24 (shown in FIG. 2) may be positioned between the internal combustion engine 12 and connect/disconnect friction clutch 16 of the P2 system 10.

Generally, the damper system 24 is positioned between the internal combustion engine 12 (hereafter "engine 12") and the P2 module 10 such that the output of the engine 12 is transferred by a crankshaft 26 to an input plate 28 of the damper system 24, which is secured to the crankshaft 26 by fasteners (not shown) or other means. While shown as incorporating a dual mass flywheel 32, it will be appreciated that the damper system 24 may incorporate other vibration damping systems and/or mechanisms without departing from the scope of the present invention. An output plate 34 of the damper system 24 couples the dual mass flywheel 32 to the input member 36 of the connect/disconnect friction clutch 16. This coupling of the output plate 34 to the input shaft 36 of the P2 module 10, and specifically the connect/disconnect friction clutch 16, is preferably achieved through a splined engagement 38.

The torque converter 18 provides a hydrodynamic circuit that is configured to multiply an input torque and transmit the increased torque as an output torque to the transmission 14 of the vehicle. The torque converter 18 includes a front cover 40 and a rear cover 42, which together cooperate to define a shell 44. The shell 44 further defines an internal chamber 46 where the hydrodynamic circuit is provided.

Rotational input to the torque converter 18 is received by the front cover 40 and transferred to an impeller 48 which is internally attached to the front cover 42 of the shell 44. The impeller 48 directs the hydrodynamic fluid radially outward and then axially forward, toward a turbine 50. The force imparted on the turbine 50 by the fluid rotationally drives the turbine 50. From the turbine 50, the fluid is directed radially inward and subsequently axially back toward the impeller 48. A stator 52, position between the turbine 50 and the impeller 48, redirects the fluid so as to efficiently transfer the fluid to the impeller 48, thereby multiplying the torque being transferred.

The turbine 50 is connected to a turbine output hub 54, and the turbine output hub 54 transfers the output torque to the input member 56 of the transmission 14. A damper assembly, not shown, may be provided in the torque converter 18 for NVH isolation before transfer of the output torque to the vehicle's transmission 14. A lock-up clutch assembly 58 may also be provided to allow the torque converter 18 to lock the input from the front cover 40 with the turbine output hub 54. Locked-up in this manner, torque being transmitted to the transmission 14 bypasses the hydrodynamic circuit of the impeller 48 and turbine 50. Such damper assemblies and lock-up clutch assemblies 58 are well-known in the field of the invention and their constructions and operations readily appreciated by those skilled in the art. Their construction and operation are therefore need not be discussed further herein.

The electric motor 20 is configured with an outwardly positioned stator 60 and an inwardly positioned rotor 62. The stator 60 is located radially outboard of the torque converter 18 and defines an outer diameter that is larger than the outer diameter of the torque converter 18.

As seen in FIG. 2, the rotor 62 is attached to the torque converter 18 via a rigid connection 64. The rigid connection 64 may be an angular bracket or flange welded to the front cover 40 of the torque converter 18 and fixed to the rotor 62 for rotation therewith. Rotational fixation of the rigid connection 64 with the rotor 62 may be via a splined or other connection or the rigid connection 64 may be integrally provided as part of the rotor 62. Attached in the above manner, the rotor 62 and shell 44 of the torque converter 18 rotate in unison.

The rigid connection 64 is also connected to and supports an outer set of friction plates 66, which are part of the electrically controllable connect/disconnect friction clutch 16. This clutch 16, when engaged, connects the rotor 62 of the electric motor 20 to the output 26 the engine 12.

As mentioned above, the output/crankshaft 26 of the internal combustion engine 12 is coupled to and causes rotation of the input shaft 36 of the P2 module 10. The input shaft 36 also carries a support hub 68 that is mounted thereon for rotation with the input shaft 36. The support hub 68 includes an axial extension 69 at its out periphery an on which are supported an inner set of friction plates 70 of the connect/disconnect friction clutch 16. As a result, the inner set of friction plates 70 rotate with the input shaft 36.

The connect/disconnect friction clutch 16 also includes an electrically controlled armature 72 that, when activated, causes a piston 74 of the friction clutch 16 to move axially, engaging and locking the two sets of friction plates 66, 70 with one another. As a result, the rotor 62 of the electric motor 20 is locked with the input shaft 36 of the P2 module 10. The connect/disconnect clutch 16 thus provides a connect/disconnect pathway between the rotor 62 of the electric motor 20 and the internal combustion engine 12, via the rigid connection 64, friction plates 66, 70, support hub 68 and input shaft 36 of the P2 module 10.

The electro-mechanical controllable clutch 22 is positioned adjacent to the torque converter 18, generally beneath and radially inward of the connect/disconnect friction clutch 16 and the electric motor 20. The electro-mechanical controllable clutch 22 is mounted via a splined engagement 76 on the input shaft 36 and includes an output member 78 connected to drive the rotor 62 via a rotationally fixed connection 80 therewith. The output member 78 is also axially restricted by a stop 82 provided on the rigid connection 64. Being axially restricted, the output member 78 also forms a reaction plate for the inner and outer friction plates 66, 70 during engagement thereof caused by the piston 74 axially moving toward the output member 78.

The electro-mechanical controllable clutch 22 may be one of a number of well-known constructions in the field of such clutches. The clutch 22 uses an electro-mechanical force to lock two mechanical elements together, which, when locked, rotationally drives the output member 78 by way of the input shaft 36. When the clutch is actuated by a controller 84, current flows through an electromagnet and produces a magnetic field. As a result, a clutch rotor 86 of the controllable clutch 22 becomes magnetized and sets up a magnetic loop that attracts a clutch armature 88 of the clutch 22. Portions of the armature 88 are pulled into mechanical engagement with portions of the rotor 86, mechanically interlocking the armature 88 with the rotor 86 of the controllable clutch 22. The output member 78 is carried by and rotationally fixed to the armature 88 resulting in the rigid connection 64, and therefore the torque converter 18, being rotationally driven by the internal combustion engine 12 during engagement of the electro-mechanical controllable clutch 22. When the controller 84 removes current from the controllable clutch 22, the clutch armature 88 disengages from the clutch rotor 86, via a spring biasing force or other means, and the engine 12 is disconnected from the torque converter 18. Electro-mechanical controllable clutches 22 are generally well-known in the field and, accordingly, further details of the construction will be readily appreciated by those skilled in the technology of the present invention.

In operation, the P2 module 10 has five operational modes. These modes include an electric motor (EM) only mode; an internal combustion engine (ICE) only mode; a combined ICE/EM mode; a regeneration mode; and ICE starting mode. These modes of operation are further discussed below.

EM-only Mode: During the P2 Module's EM-only mode of operation, the internal combustion engine 12 is off and torque is only transmitted by operation of the electric motor 20. Thus, the 60 stator of the electric motor 20 is energized causing rotation of the rotor 62. Torque from the rotor 62 is transmitted via the rigid connection 64 to the front cover 40 of torque converter 18, and the torque converter 18 operates as discussed above transmitting torque to the turbine hub 54 and the input shaft 56 of the transmission 14. With the internal combustion engine 12 being off, and the electromechanical controllable clutch 22 and electric connect/disconnect friction clutch 16 disengaged, the outer friction plates 66 of the electric connect/disconnect friction clutch 16 overrun the inner friction plates 70 and no torque is transmitted between the two sets of plates 66, 70. The EM-only mode may be employed when starting the vehicle from a stopped position or to maintain higher cruising speeds of the vehicle.

IE-only Mode: During IE-only mode, torque is transmitted from the engine 12 to the input shaft 36 of the P2 module 10 and the electro-mechanical controllable clutch 22 is engaged with the electric connect/disconnect friction clutch 16 being disengaged. The stator 60 of the electric motor 20 is also not engaged and, accordingly, no torque is transmitted from the electric motor 20. With the electro-mechanical controllable clutch 22 being engaged, its output member 78 rotationally drives the rigid connection 64, thereby transmitting torque into the torque converter 18 via the front cover 40. From the front cover 40, torque is transmitted by way of the impeller 48 and turbine 50 to the output hub 54 of the turbine and the input shaft 56 of the transmission 14.

Combined ICE/EM Mode: During the combined ICE/EM mode of operation, both the internal combustion engine 12 and electric motor 20 are operating. Thus, the 60 stator of the electric motor 20 is energized causing rotation of the rotor 62 and the rigid connection 64. Torque from the rotor 62 is transmitted via the rigid connection 64 to the front cover 40 of torque converter 18. Torque from the engine 12 is transmitted to the input shaft 36 of the P2 module 10 and the electro-mechanical controllable clutch 22 is engaged whereby the output member 78 is also rotationally driving the rigid connection 64. The combined torque is transmitted via the impeller and turbine to the torque converter's output hub 54 and to the input shaft 56 of the transmission 14. The electric connect/disconnect friction clutch 16 is disengaged in this mode.

Regeneration Mode: During the regeneration mode, the electric motor 20 is operated in a manner allowing for the batteries of the vehicle to be recharged. In the regeneration mode, torque is transmitted from the wheels of the vehicle through the transmission 14 and to the input shaft 56 of the transmission 14. From this input shaft 56, torque is transferred back through the turbine 50 and impeller 48, causing rotation of the shell 44. From the front cover 40 of the shell 54, torque is transferred through the rigid connection 64 to the rotor 62 of the electric motor 20. With rotation of the rotor 62 and no other input to the stator 60, the stator 60 is caused to emit electrical energy back into the electrical system of the vehicle, which allows for recharging the vehicle's batteries. Both the electric connect/disconnect friction clutch 16 and the electromechanical controllable clutch 22 are disengaged and in an overrunning condition while in this mode of operation.

ICE Starting Mode: The ICE starting mode is utilized to start the internal combustion engine 12 after a brief stopping of the engine 12, such as the starting engine 12 of after stopping the engine 12 at a stop light. In this mode of operation, the stator 60 of the electric motor 20 is energized causing the rotor 62 to rotate. Unlike the EM-only mode, during the ICE starting mode the electric connect/disconnect friction clutch 16 is engaged to lock the outer friction plates 66 with the inner friction plates 70 and drive the support hub 68. Being rotationally fixed with the input shaft 36, the driving of the support hub 68 in turn drives rotation of P2 module's input shaft 36 and transmits torque to the output/crankshaft 26 of the engine 12. With a sufficient rotational speed applied to the engine 12 via the output/crankshaft 26, the engine 12 is able to start. The electro-mechanical controllable clutch 22 is initially disengaged and is in an overrunning condition during the mode of operation. Once the engine 12 is started, however, the electric connect/disconnect friction clutch 16 may be disengaged and the electro-mechanical controllable clutch 22 engaged. Torque may then be transmitted to the torque converter 18 and transmission 12 by operation in either the combined ICE/EM mode of operation or the ICE-only mode of operation.

Employment of the electro-mechanical controllable clutch 22 in the P2 module 10 significantly reduces the axial and radial package space required in P2 module 10 over previously known P2 modules, particularly when compared to conventional hydraulic clutches and mechanical K0 clutches.

The strategy of employing the electric connect/disconnect friction clutch 16 for the ICE start mode allows for a reduced plate count and a smaller friction clutch size. This reduces both the axial and radial package size of the P2 module and also eliminates the complexities associated with a hydraulic supply system for a hydraulic clutch employed for the same purpose.

Alternative constructions for the electric connect/disconnect friction clutch 16 include any arrangements that couple the rotor 62 and/or torque converter shell 44 to the output/crankshaft 26 of the internal combustion engine 12. Alternative constructions for the electric connect/disconnect friction clutch 12 also include configurations used to couple the output 26 of the internal combustion engine 12 directly to the input 56 of the transmission 14.

Alternative constructions for the electro-mechanical controllable clutch 22 include connections of the rotor 86 to a clutch housing or a friction clutch or to provide the clutch 22 such that it is directly connected to the output/crankshaft 26 of the internal combustion engine 12. The electro-mechanical controllable clutch 22 may be either a one-way clutch, a dual mode clutch or any device that can be activated to react to torque in either direction.

The proposed architecture may be employed with dry or wet clutch torque converter 18 applications.

The above description is meant to be illustrative of at least one preferred implementation incorporating the principles of the invention. One skilled in the art will really appreciate that the invention is susceptible to modification, variation and change without departing from the true spirit and fair scope of the invention, as defined in the claims that follow. The terminology used herein is therefore intended to be understood in the nature of words of description and not words of limitation.

We claim:

1. A compact P2 hybrid module for connecting an internal combustion engine to a transmission of a vehicle, the architecture comprising:
   an input shaft;
   an electric motor having a stator and a rotor;
   a torque converter having a front cover and a rear cover, the torque converter further including an impeller and a turbine coupled to one another so as to form a hydrodynamic circuit, the turbine being further coupled to an output member of the torque converter, the front cover of the torque converter being rotationally fixed with the rotor of the electric motor;
   an electric connect/disconnect friction clutch assembly not forming a part of the torque converter and being located radially inward of the electric motor, the electric connect/disconnect friction clutch assembly having first and second sets of friction plates, the first and second sets of friction plates being rotationally lockable with one another during engagement of the electric connect/disconnect friction clutch assembly;
   an electro-mechanical controllable clutch assembly, the electro-mechanical controllable clutch assembly having an input member and an output member, the input member and output member being rotationally lockable with one another during engagement of the electro-mechanical controllable clutch assembly, and wherein the output member of the electro-mechanical controllable clutch assembly is coupled to a clutch armature of the electro-mechanical controllable clutch assembly.

2. A compact P2 hybrid module for connecting an internal combustion engine to a transmission of a vehicle, the architecture comprising:
   an input shaft;
   an electric motor having a stator and a rotor;
   a torque converter having a front cover and a rear cover, the torque converter further including an impeller and a turbine coupled to one another so as to form a hydrodynamic circuit, the turbine being further coupled to an output member of the torque converter, the front cover of the torque converter being rotationally fixed with the rotor of the electric motor;
   an electric connect/disconnect friction clutch assembly not forming a part of the torque converter and being located radially inward of the electric motor, the electric connect/disconnect friction clutch assembly having first and second sets of friction plates, the first and second sets of friction plates being rotationally lockable with one another during engagement of the electric connect/disconnect friction clutch assembly;
   an electro-mechanical controllable clutch assembly, the electro-mechanical controllable clutch assembly having an input member and an output member, the input member and output member being rotationally lockable with one another during engagement of the electro-mechanical controllable clutch assembly, and wherein the output member of the electro-mechanical controllable clutch assembly defines a reaction plate of the electric connect/disconnect friction clutch assembly.

\* \* \* \* \*